United States Patent
Oi (10) Patent No.: US 8,312,472 B2
(45) Date of Patent: Nov. 13, 2012

(54) PROGRAM STARTUP APPARATUS AND METHOD

(75) Inventor: Hirokazu Oi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 413 days.

(21) Appl. No.: 12/625,708

(22) Filed: Nov. 25, 2009

(65) Prior Publication Data

US 2010/0077405 A1    Mar. 25, 2010

Related U.S. Application Data

(63) Continuation of application No. PCT/JP2008/059682, filed on May 27, 2008.

(30) Foreign Application Priority Data

Jun. 7, 2007    (JP) ................ 2007-152062

(51) Int. Cl.
*G06F 3/00* (2006.01)
*G06F 9/455* (2006.01)
*G06F 15/177* (2006.01)

(52) U.S. Cl. .......... 719/313; 718/100; 709/220

(58) Field of Classification Search .......... None
See application file for complete search history.

(56) References Cited

U.S. PATENT DOCUMENTS

| | | | | |
|---|---|---|---|---|
| 2003/0191823 A1* | 10/2003 | Bansal et al. | ............ | 709/220 |
| 2005/0117773 A1 | 6/2005 | Kobayashi | ............ | 382/100 |
| 2007/0198583 A1* | 8/2007 | Hamada | ............ | 707/104.1 |
| 2008/0046755 A1* | 2/2008 | Hayes | ............ | 713/187 |
| 2008/0115130 A1* | 5/2008 | Danninger | ............ | 718/100 |

FOREIGN PATENT DOCUMENTS

| | | |
|---|---|---|
| JP | 2003-523568 | 8/2003 |
| JP | 2004-192630 | 7/2004 |
| JP | 2006-85529 | 3/2006 |
| WO | WO 01/53936 A2 | 7/2001 |

OTHER PUBLICATIONS

The OSGI Alliance, *OSGI Service Platform Core Specification*, Release 4 (Aug. 2005) (for the standard of life cycle management see Chapter 4.3, "The Bundle Objects").

* cited by examiner

*Primary Examiner* — Andy Ho
*Assistant Examiner* — Tuan Dao
(74) *Attorney, Agent, or Firm* — Fitzpatrick, Cella, Harper & Scinto (57) ABSTRACT

A program startup apparatus includes a first startup unit and a second startup unit. The first startup unit starts up a first program. The first program starts up a second program. The first startup unit sets the second startup unit such that the second startup unit starts up the second program. This makes it possible to unify startup of programs of different types and enable quick startup of a program.

18 Claims, 12 Drawing Sheets

| APPLICATION ID | NATIVE PROGRAM PRESENCE/ABSENCE FLAG | NATIVE PROGRAM PATH | Java PROGRAM START FLAG | NATIVE PROGRAM STARTUP COMPLETE FLAG |
|---|---|---|---|---|
| ... | ... | ... | ... | ... |
| ... | ... | ... | ... | ... |

PROGRAM STARTUP APPARATUS AND METHOD

TECHNICAL FIELD

The present invention relates to a program startup apparatus and method.

BACKGROUND ART

Conventionally, when starting up various kinds of software programs (to be simply referred to as programs hereinafter), some contrivance is often made for startup control, aiming at the optimum form of use of the system.

For example, there is a technique for the purpose of executing a plurality of program modules in a preferable order without altering an application program main body (e.g., patent reference 1).

There also exists a technique of starting up a program associated with check processing in accordance with a result of check processing of a hardware resource (e.g., patent reference 2).

Another technique inputs a symbol to start up stored applications at once (e.g., patent reference 3).

As a method of managing a plurality of software modules, for example, a standard defined by OSGi (Open Service Gateway Initiative) exists (e.g., non-patent reference 1). This standard defines specifications of so-called "life cycle management" to install, start, stop, and uninstall a software module.

Patent reference 1: Japanese Patent Laid-Open No. 2006-85529

Patent reference 2: Japanese Patent Laid-Open No. 2004-192630

Patent reference 3: Japanese Patent Laid-Open No. 2003-523568

Non-patent reference 1: "OSGi Service Platform Release 4", Open Service Gateway Initiative, September 2006

DISCLOSURE OF INVENTION

Problems that the Invention is to Solve

However, the above-described conventional techniques do not apply one program startup method to start up programs of different types.

For example, in the OSGi standard, software management and control are performed for each program which is called a bundle and implemented in the Java® language. However, this standard is incapable of controlling a native program including native codes unique to a microprocessor.

To simply control of a native program, a program control unit (to be referred to as an OSGi framework hereinafter) that supports control of not only Java programs but also native programs can be used.

In this method, however, startup of a native program comes after that of the OSGi framework.

An embedded device normally requires high-speed startup after power-on. A native program is generally faster than a Java program. For this reason, a program that need especially be started up quickly is created as a native program. On the other hand, a program that allows relatively slow startup is created as a Java program. The OSGi framework itself is a Java program.

In this case, device startup control is done in the order of native programs, OSGi framework, and Java programs or native programs started up by the OSGi framework.

Hence, startup of native programs to be started up by the OSGi framework delays absolutely.

The present invention has been made in consideration of the above-described problem, and has as its object to unify startup of programs of different types and enable quick startup of a program.

Means of Solving the Problems

According to the present invention, there is provided a program startup apparatus comprising: a first startup unit that starts up a first program; and a second startup unit that starts up a second program, wherein the first program starts up the second program, and the apparatus further comprises a setting unit that sets the second startup unit that starts up the second program so as to start up the second program before the first program.

Effect of the Invention

According to present invention, it is possible to unify startup of programs of different types and enable quick startup of a program.

BEST MODE FOR CARRYING OUT THE INVENTION

An embodiment of the present invention will now be described based on the drawings.

Figure 1:
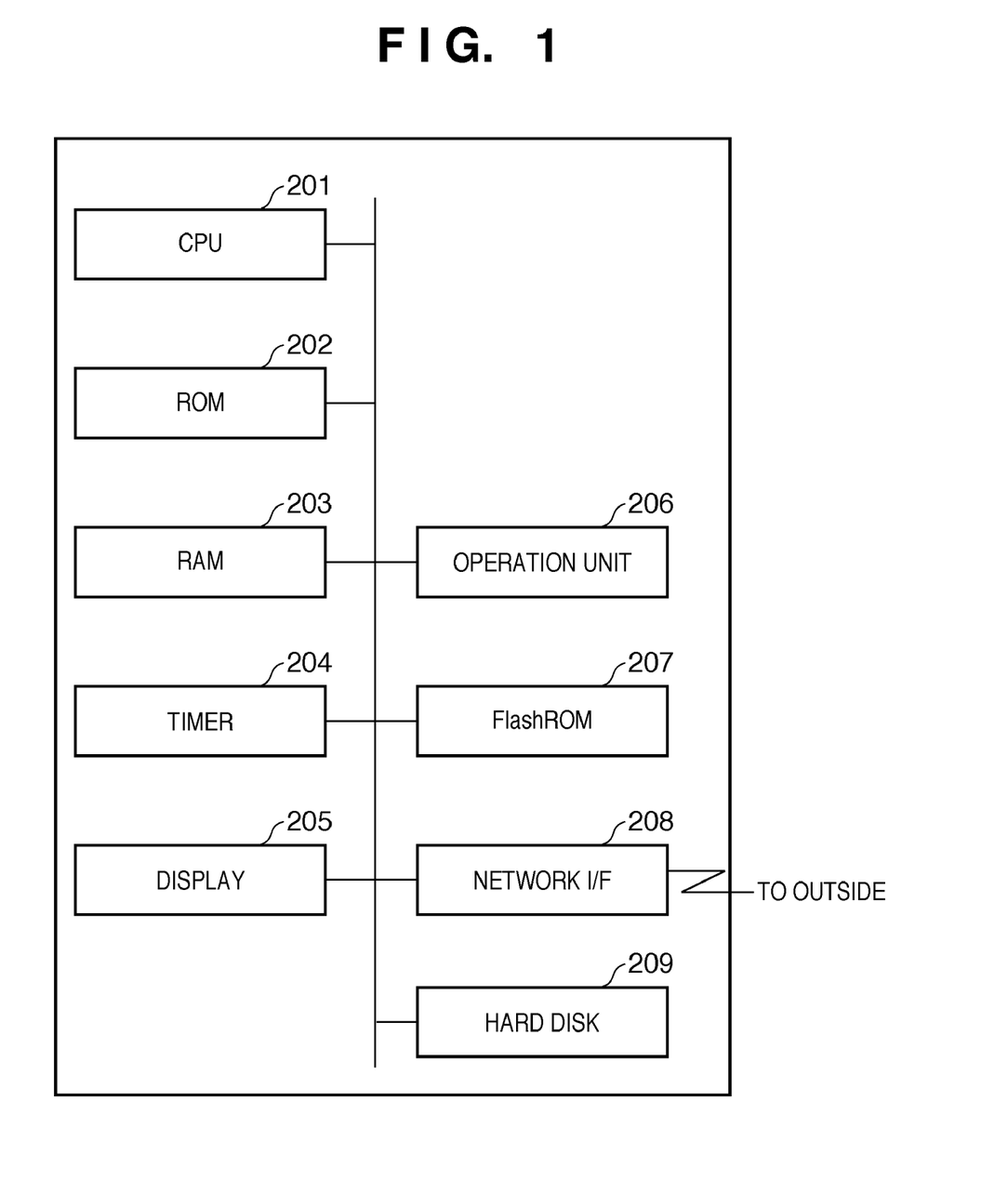
FIG. 1 is a block diagram showing an example of the hardware configuration of an information processing apparatus (computer)

FIG. 1 is a block diagram showing an example of the hardware configuration of an information processing apparatus (computer).

Referring to FIG. 1, the information processing apparatus includes a CPU 201, ROM 202, RAM 203, timer 204, display 205, operation unit 206, Flash ROM 207, network I/F 208, and hard disk (HD) 209.

The CPU 201 controls the entire information processing apparatus. The ROM 202 stores various kinds of programs and the like. The RAM 203 stores programs that are running, and also temporarily stores data and the like used in the running programs.

The timer 204 measures various kinds of times. The display 205 displays a user interface. The operation unit 206 is formed from, for example, a keyboard, mouse, or touch display and inputs information. The Flash ROM 207 stores various kinds of set data files and the like. The network I/F 208 connects the information processing apparatus to an external apparatus. The HD 209 stores various programs and set data files.

The CPU 201 is formed from a microprocessor. The CPU 201 loads the programs from the ROM 202 or the HD 209 onto the RAM 203 and executes them, thereby implementing functions or processes concerning the flowcharts to be described later.

Figure 2:
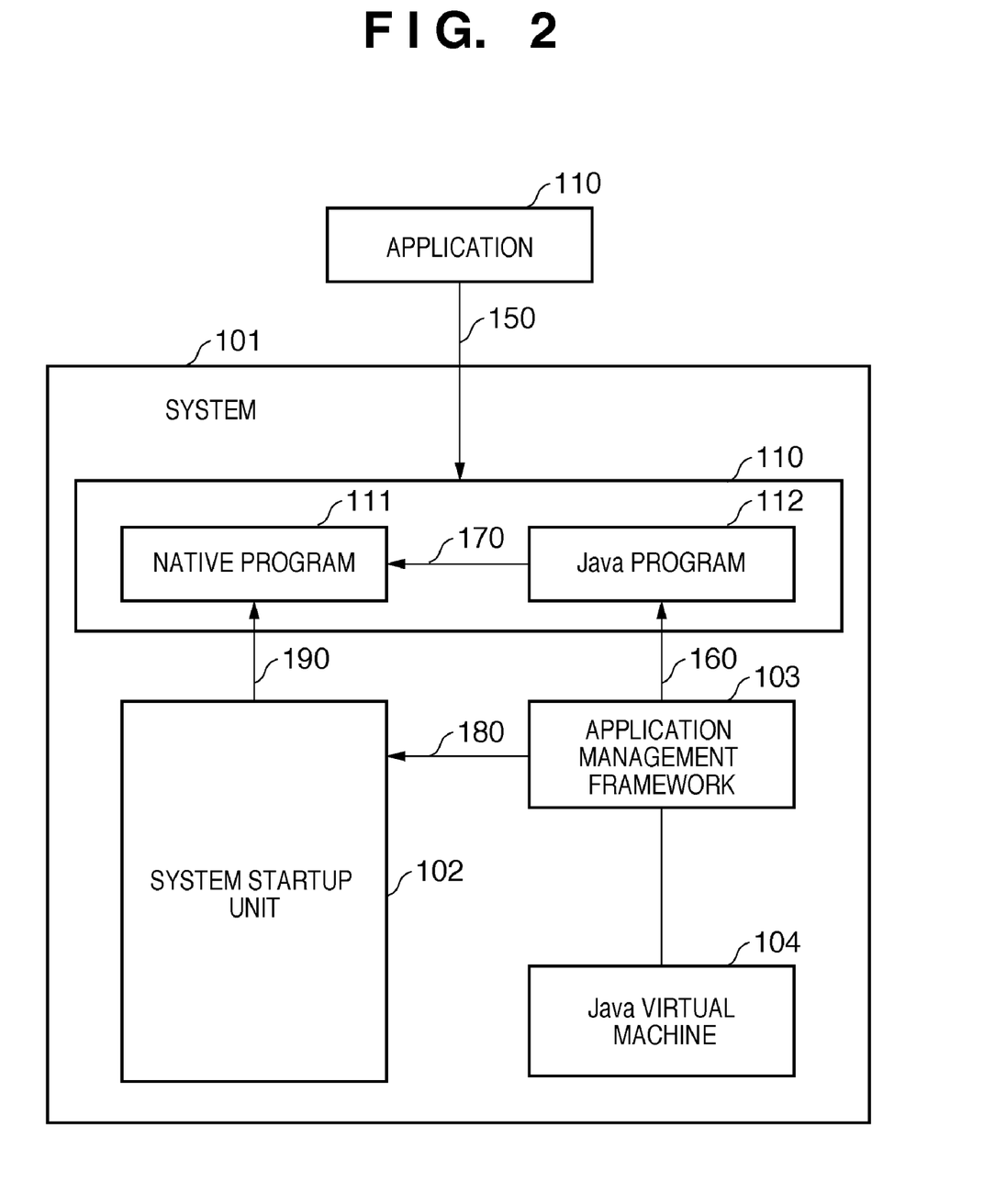
FIG. 2 is a block diagram showing an example of the functional arrangement of the information processing apparatus.

FIG. 2 is a block diagram showing an example of the functional arrangement of the information processing apparatus. Note that a system 101 in FIG. 2 corresponds to, for example, the information processing apparatus in FIG. 1. The functions shown in FIG. 2 are implemented by causing the CPU 201 to execute programs read out from the RAM 203 or the like.

When starting up the system 101, a system startup unit 102 starts up one or a plurality of native programs. An application management framework (to be simply referred to as a framework hereinafter) 103 manages an application 110. More specifically, the framework 103 performs management throughout the life cycle of one or a plurality of applications 110 by, for example, installing them in the system 101, starting, ending, and uninstalling them.

A Java virtual machine 104 executes an intermediate code (Java program) obtained by compiling a source code described in the Java language. The framework 103 itself is a Java program. The Java virtual machine 104 has a role of making the framework 103 run.

Note that this embodiment mentions a Java program. However, the Java program or the Java virtual machine 104 is merely an example of a program different from a native program. That is, this embodiment is not limited to the Java language and programs. The present invention is also applicable to any other languages and programs.

The application 110 is an application of the management unit of the framework 103 and includes at least one Java program 112. The Java program 112 has an interface (Java method) 160 in FIG. 2 to receive a start request or a stop request from the framework 103. More specifically, these requests are executed by causing the framework 103 to invoke the Java method in the Java program 112.

The application 110 can also have a native program 111 including a native code unique to the microprocessor. However, the application need not always include the native program 111, as will be described later. That is, the application 110 need not include the native program 111 if it includes the Java program 112.

When the application 110 includes the Java program 112 and the native program 111, the functions can be arbitrarily allotted. As a possible form, the native program 111 implements the main functions of the application 110, whereas the Java program 112 has only an interface to receive an application management request from the framework 103. This implementation form is significant because the native program 111 is commonly executed more quickly than the Java program 112.

Figure 3:
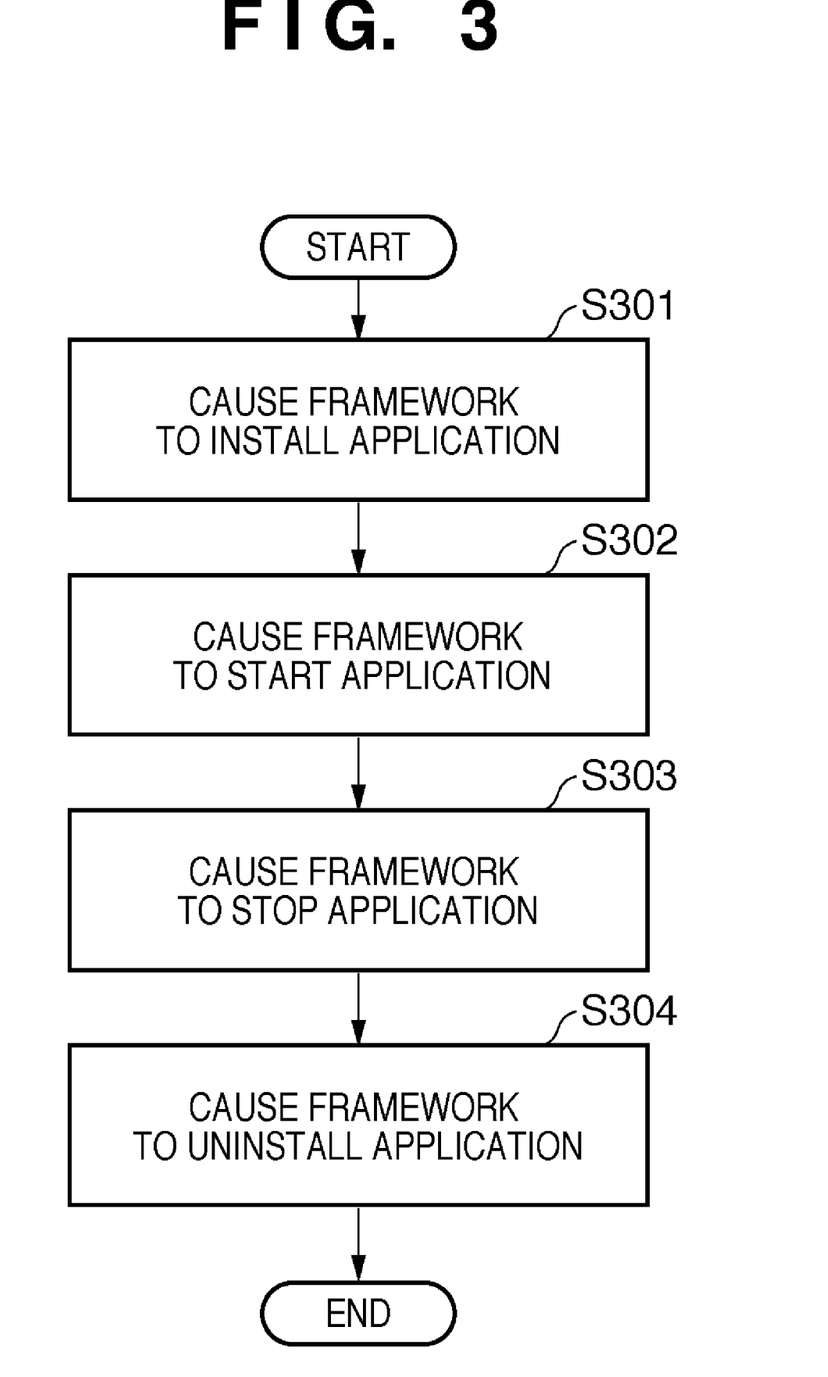
FIG. 3 is a flowchart illustrating an example of the execution procedure of a Java application.

The execution procedure of a Java application which is a form of the application 110 including only the Java program 112 but no native program 111 will be described with reference to the flowchart in FIG. 3. FIG. 3 is a flowchart illustrating an example of the execution procedure of a Java application.

First, to install the Java application in the system 101, the user performs a predetermined operation using the operation unit 206. The location of the installation target Java application is not particularly limited. It may exist in the HD 209 or in another device connected to the system 101 via a network. By the predetermined operation using the operation unit 206, the user can designate the position of the installation source of the Java application.

When the user performs the predetermined operation, the framework 103 installs the Java application (step S301). The installed Java application is stored at a position on the HD 209 where an installed application is placed.

Figure 4:
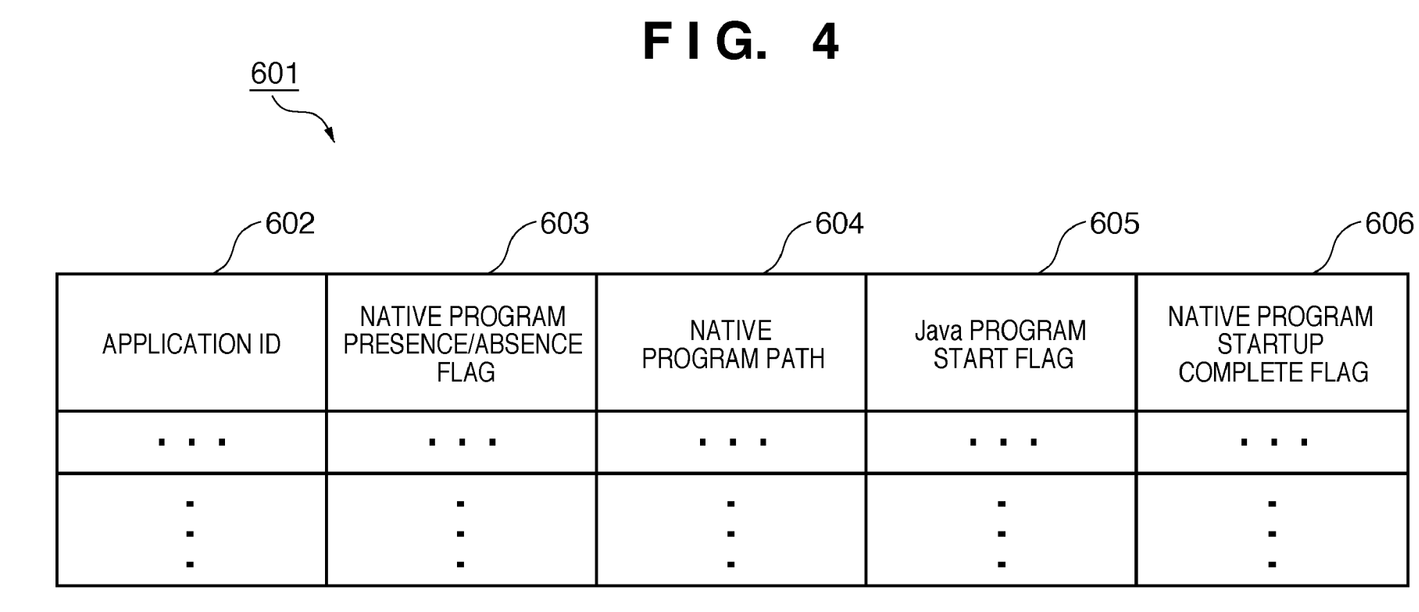
FIG. 4 is a view showing an example of the arrangement of an application management table.

The framework 103 stores information about the installed Java application in an application management table on the RAM 203. The arrangement of the application management table is shown in FIG. 4. FIG. 4 is a view showing an example of the arrangement of the application management table.

As shown in FIG. 4, an application management table 601 includes, as constituent elements, an application ID 602 and a native program presence/absence flag 603 of the installed application. The application management table 601 also includes, as constituent elements, a native program path 604, Java program start flag 605, and native program startup complete flag 606.

The application ID 602 is an ID to identify the plurality of applications 110 installed in the system 101 from each other. The native program presence/absence flag 603 is a flag representing whether the application 110 has the native program 111. The native program path 604 is a path indicating the storage location of the native program 111 included in the application. The Java program start flag 605 is a flag representing whether to start up the Java program 112 even when the native program 111 has already been started up. The native program startup complete flag 606 is a flag representing whether the native program 111 has already been started up.

The application 110 includes some of these elements (information). Assume that the application 110 is provided as a Java Archive file (Jar file) which is often used as an arrangement unit in a Java execution environment. In this case, the Jar file can include not only the executable program main body but also a manifest file which is an example of definition information storing various kinds of information. In this embodiment, an application ID, native program presence/absence, native program file name, and Java program start flag can be set in the manifest file.

Note that in this embodiment, the native program is assumed to be implemented as a dynamic link library (DLL) file. However, the present invention is not limited to this.

At the time of installation, for example, the framework 103 directly stores, in the application management table 601, the application ID, native program presence/absence, and Java program start flag in the manifest file. As for the native program path 604, the framework 103 determines the path to be stored based on the native program file name in the manifest file and the directory on the HD 209 where the native program is actually arranged.

The path is determined in the following way. Assume that the manifest file describes "AAA.dll" as the file name of the native program to be executed. When installing the application 110, the native program file group of the application 110 is assumed to be stored in a directory "/apps/app_1/natives" on the HD 209. In this case, the framework 103 determines "/apps/app_1/natives/AAA.dll" as the native program path and stores it in the native program path 604. Even when a plurality of native program files exists, this makes it possible to uniquely determine the native program files to be started up.

Referring back to step S301 of FIG. 3, since a Java application is installed here, only the application ID 602 and the native program "absence" information 603 are stored in the application management table 601. The remaining pieces of information about a native program are not stored in the application management table 601.

After installation, when the user performs a predetermined application start operation, the framework 103 starts the Java application by invoking a predetermined method in it (step S302). As the predetermined method, a method that defines a start interface is invoked.

After the start, when the user performs a predetermined application stop operation, the framework 103 stops the Java application by invoking a predetermined method in it (step S303). As the predetermined method, a method that defines a stop interface is invoked.

After the stop, when the user performs a predetermined application uninstallation operation, the framework 103 uninstalls the Java application concerned from the installed application storage area on the HD 209 (step S304). At this time, the framework 103 deletes information about the Java application concerned from the application management table 601 as well.

Note that the sequence in FIG. 3 explains the life cycle of the Java application and need not always be executed in this order. The Java application may sometimes be started and then continuously used. Alternatively, the installed Java application may be uninstalled without being started.

Figure 5A:
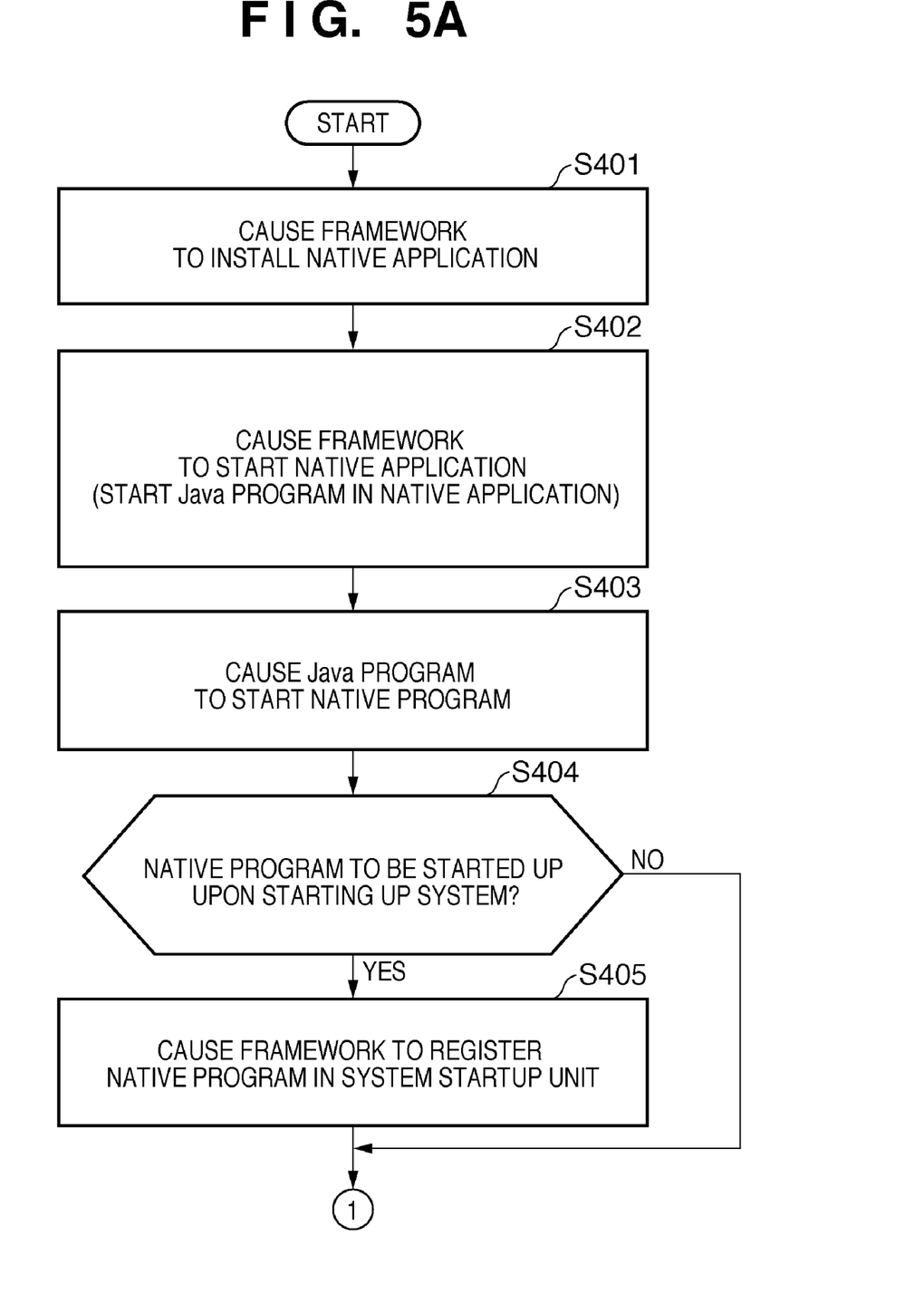
FIG. 5A is a flowchart illustrating an example of the execution procedure of a native application.
Figure 5B:
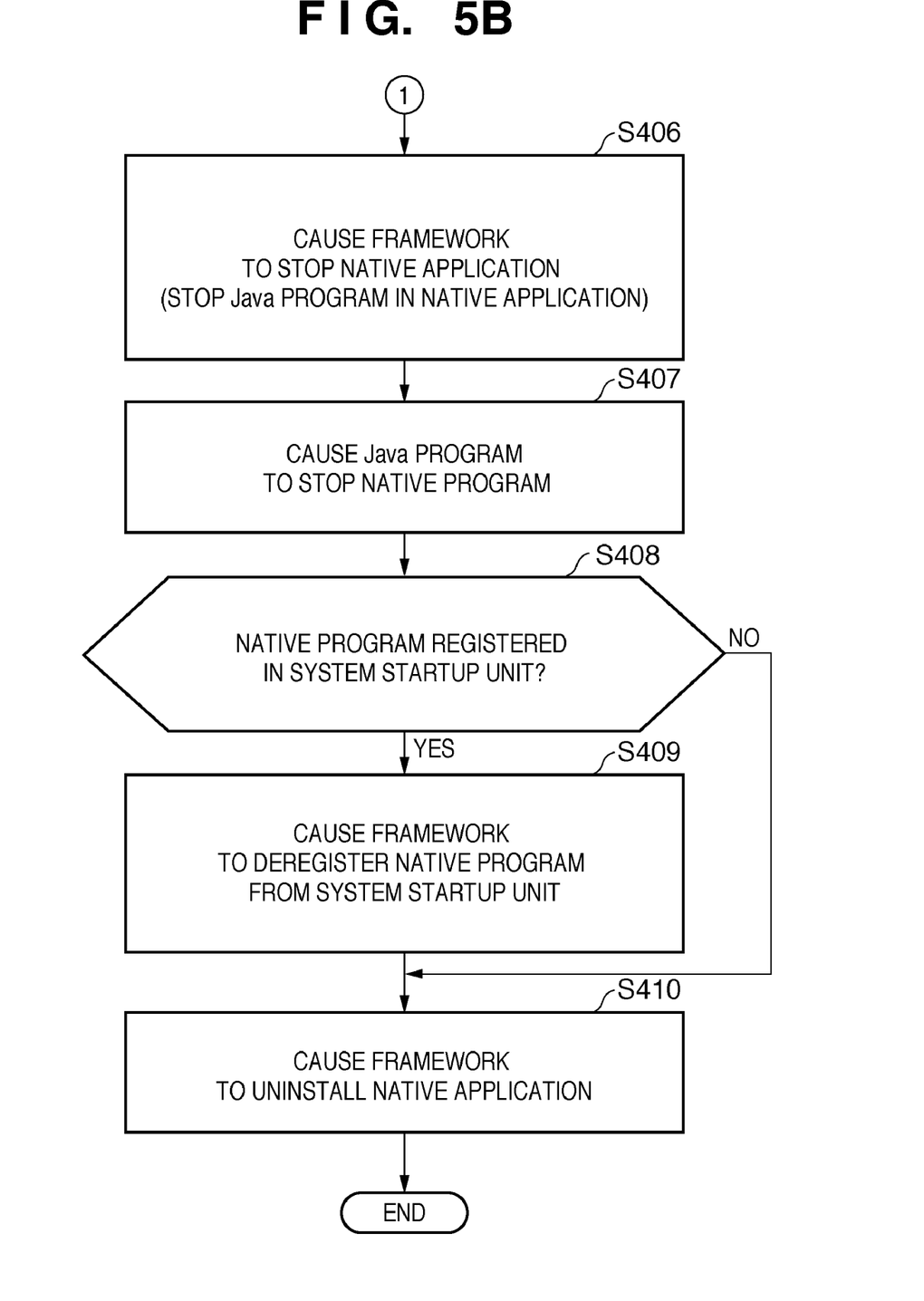
FIG. 5B is a flowchart illustrating an example of the execution procedure of a native application.

The execution procedure of a native application will be described next with reference to the flowcharts in FIGS. 5A and 5B. FIGS. 5A and 5B are flowcharts illustrating an example of the execution procedure of a native application. The native application indicates the application 110 including the native program 111 and the Java program 112.

First, to install the native application in the system 101, the user performs a predetermined operation using the operation unit 206. Then, the framework 103 downloads the native application from the outside of the system 101 to the inside of the system 101 (step S401), as indicated by 150 in FIG. 2. The downloaded native application is stored in a predetermined place (storage area) of the HD 209.

At the time of installation, the framework 103 stores, in the application management table 601, information described in the manifest file of the native application, as in FIG. 3 described above. More specifically, the framework 103 directly stores, in the application management table 601, the information of the application ID, native program presence/absence flag, and Java program start flag described in the manifest file. The native program presence/absence flag 603 is "presence", as a matter of course. As the native program path 604, a path determined based on the native program file name in the manifest file and the directory on the HD 209 where the native program is actually installed is stored.

Next, to start the native application, the user performs a predetermined operation using the operation unit 206. Then, the framework 103 starts the installed native application (step S402), as indicated by 160 in FIG. 2. At this time, the framework 103 starts the native application by invoking a predetermined method of the Java program 112 in the native application. The predetermined method defines a start interface and is called a start method.

The start method which has been invoked starts the native program 111 packaged in the native application (step S403), as indicated by 170 in FIG. 2.

To start, the Java language's function of invoking a native code is used. Note that not only the Java language but also any other program language often has a native code invocation function. The native code invocation is done by the Java virtual machine 104. At this time, the Java virtual machine 104 searches for the native code using the information of the native program path 604. The Java virtual machine 104 loads, to the RAM 203, a DLL file stored at the storage location indicated by the information and searches for the symbol of the native code of the invocation target. The Java virtual machine 104 invokes the found native code.

Note that starting (starting up) the native program 111 using the above process is called starting (starting up) the native program 111 from the Java program 112. In other words, the native program 111 can be started up from the Java program 112.

The native program 111 is started in the above-described way. At this point of time, the system 101 can use the functions provided by the native program 111 and the Java program 112.

The framework 103 then determines whether to start up the native program 111 at the time of startup of the system 101 (step S404). Information representing whether to start up the native program is described in the manifest file. As a typical example, the manifest file describes, as a program to be started up, a program to be started up quickly or a program to be started up ahead of the framework 103. The manifest file does not describe, as a program to be started up, a program which need not be started up quickly or a program which should not impede other programs to be started up. The framework 103 confirms the description of the manifest file and determines whether to start up the native program.

Upon determining to start up the native program, the framework 103 registers the native program 111 in the system startup unit 102 (step S405), as indicated by 180 in FIG. 2. More specifically, the information of the native program path 604 is stored in a storage area managed by the system startup unit 102.

If it is not determined to start up the native program, the framework 103 skips the process in step S405.

Next, to stop the native application, the user performs a predetermined operation using the operation unit 206. Then, the framework 103 stops the installed native application (step S406). The framework 103 stops the native application by invoking a predetermined method of the Java program 112 in the native application. The predetermined method defines a stop interface and is called a stop method.

The stop method which has been invoked stops the native program 111 packaged in the native application (step S407). To stop it, the Java language's function of invoking a native code is used, like the above-described start method.

The framework 103 then determines whether the native program 111 is registered in the system startup unit 102 (step S408). That is, the framework 103 determines whether the native program 111 has been registered in the system startup unit 102 in step S405.

Upon determining that the native program 111 is registered, the framework 103 deregisters the registered native program 111 from the system startup unit 102 (step S409). More specifically, the framework 103 erases the native program path information from the storage area managed by the system startup unit 102. Upon determining that the native program 111 is not registered, the framework 103 skips the process in step S409.

The system 101 of this embodiment assumes that the user's stop operation is effective even in the next startup of the system 101, that is, the system startup unit 102 does not start up the native program 111 at the next time of starting up the system 101. Without such specifications, the processes in steps S408 and S409 are unnecessary. If the specifications require deregistration only upon uninstallation, the process in step S409 is executed after the process in step S410 to be explained next.

Next, to uninstall the native application, the user performs a predetermined operation using the operation unit 206. Then, the framework 103 uninstalls the native application (step S410). More specifically, the framework 103 uninstalls the native application concerned from the installed application storage area on the HD 209. At this time, the framework 103 deletes information about the native application concerned from the application management table 601 as well. Without the uninstallation operation, the process in step S410 is not performed. It does not mean that after the stop of a native application, the stopped native application should always be uninstalled.

In the above-described procedure, the framework 103 registers the native program 111 in the system startup unit 102 (step S405) when starting the Java program 112 (step S402).

However, another procedure may be adopted. For example, when the framework 103 has installed the native application (step S401), the manifest file becomes accessible. Hence, the native program 111 may be registered at this point of time.

Alternatively, the user may operate the operation unit 206 at another timing such as during the steady operation of the system 101 to make the framework 103 register the native program 111 in the system startup unit 102.

Figure 6A:
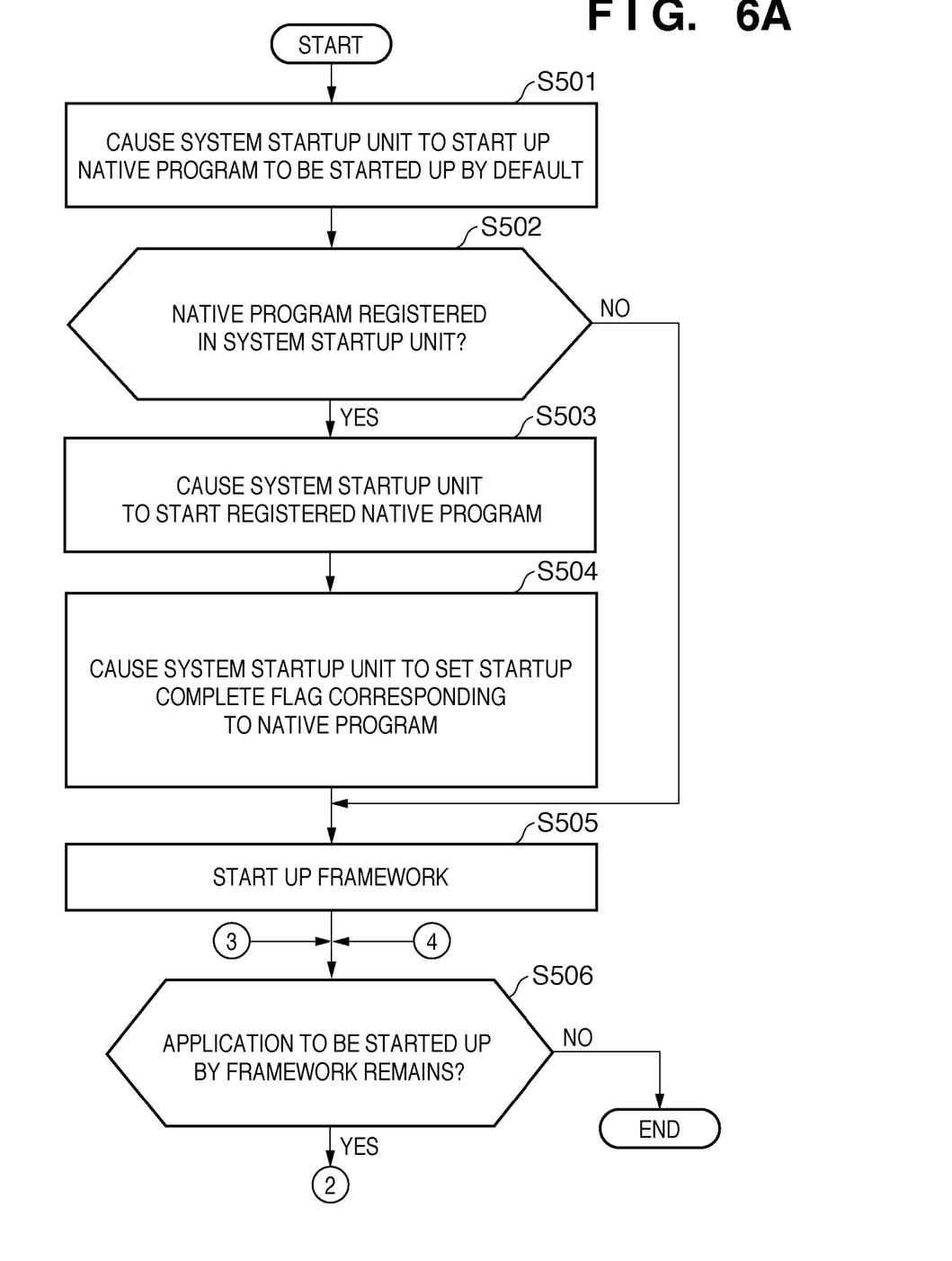
FIG. 6A is a flowchart illustrating an example of the startup procedure of a system 101.
Figure 6B:
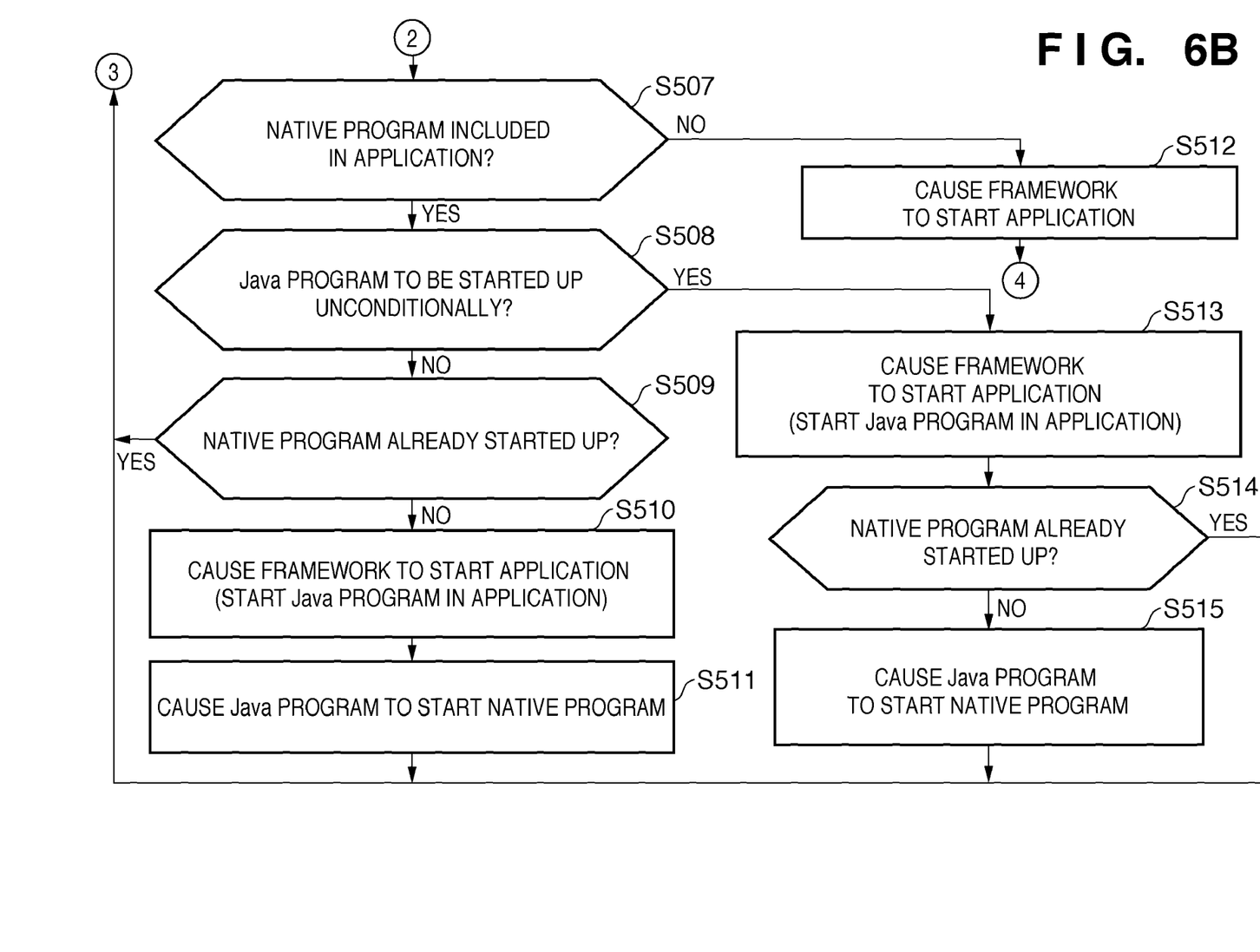
FIG. 6B is a flowchart illustrating an example of the startup procedure of the system 101.

The startup procedure of the system 101 will be described next with reference to the flowcharts in FIGS. 6A and 6B. FIGS. 6A and 6B are flowcharts illustrating an example of the startup procedure of the system 101.

The system startup unit 102 starts up native programs to be started up by default (step S501). These are programs built in the system 101 in advance, and installation by the user is unnecessary.

Next, the system startup unit 102 determines whether the native program 111 which should be started up upon starting up the system 101 is registered (step S502). Assume that the native program 111 is registered in the system startup unit 102 in step S405 of FIG. 5A, and then, the system 101 is temporarily shut down and started up again. Note that the native program 111 is not deregistered from the system startup unit 102 in step S409.

Upon determining that the native program 111 is registered, the system startup unit 102 starts the registered native program 111 (step S503), as indicated by 190 in FIG. 2. More specifically, the system startup unit 102 acquires the information of the native program path 604 stored in the above-described storage area, obtains the symbol of the start interface from the DLL indicated by the information, and performs invocation for that address.

The start interface 190 is not directly relevant to the start interface 170 described concerning step 403. The start operations may be different. Hence, the start interfaces themselves may be different.

The system startup unit 102 sets the startup complete flag corresponding to the started native program 111 (step S504). More specifically, the system startup unit 102 sets the native program startup complete flag 606 in the application management table 601, which corresponds to the native program 111. As another method, if the framework 103 is managing the application management table 601, the system startup unit 102 may request the framework 103 to set the flag.

In the process of steps S502 to S504, the system startup unit 102 can start a plurality of registered native programs and set flags for them. However, for the sake of simplicity, a description of a loop to start a plurality of native programs registered in the system startup unit 102 and set flags for them will be omitted.

Upon determining in step S502 that the native program 111 is not registered, the system startup unit 102 advances the process to step S505.

When startup of the native programs is complete, the system 101 starts up the framework 103 via the Java virtual machine 104 (step S505).

The framework 103 then determines whether the application 110 to be started up remains (step S506).

If YES in step S506, the framework 103 determines whether a selected one of the applications 110 includes the native program 111 (step S507). More specifically, the framework 103 confirms the native program presence/absence flag 603 corresponding to the application 110, and determines whether the application 110 includes the native program 111.

If the native program 111 is not present, the framework 103 starts the application 110 (step S512). After that, the framework 103 returns to step S506. In step S512, the application 110 including no native program 111 but the Java program 112 is started.

If the native program 111 is present, the framework 103 confirms (refers to) the Java program start flag 605 corresponding to the application 110. The framework 103 determines whether to unconditionally start the Java program 112 in the application 110 (step S508). If the Java program start flag 605 is set to "start", the framework 103 interprets it as the Java program 112 should be started unconditionally.

Upon determining not to unconditionally start, the framework 103 confirms the native program startup complete flag 606 corresponding to the application 110, and determines whether the corresponding native program 111 has already been started up (step S509).

Upon determining that the native program has already been started up, the framework 103 returns to step S506.

Upon determining that the native program has not been started up yet, the framework 103 starts up the application 110 (step S510). Actually, the framework 103 invokes a predetermined method of the Java program 112 in the application 110.

The Java program 112 then starts the native program 111 (step S511). After that, the Java program 112 returns the process to step S506.

With the above-described process from step S507, the processing of the application 110 concerned ends. The framework 103 starts the processing of the next application 110 in step S506.

When the framework 103 has finished starting up all the applications 110 to be started up, step S506 ends with NO, and the system startup processing ends.

Note that in step S508, the framework 103 determines whether to unconditionally start the Java program. "Unconditionally" means that "even when the system startup unit 102 has already started up the native program 111". If the native program 111 and the Java program 112 have different roles and functions, the Java program 112 sometimes needs to be started up even if the native program 111 has already been started up. A sequence in this case will be explained below.

Upon determining in step S508 to unconditionally start, the framework 103 starts up the application 110 (step S513).

Actually, the framework 103 invokes a predetermined method of the Java program 112 in the application 110.

Next, the Java program 112 determines whether the corresponding native program 111 has already been started up (step S514). The determination may be done based on the native program startup complete flag 606. Alternatively, the determination may be done by verifying with the native program 111 whether it has already been started up using a predetermined interface between the native program 111 and the Java program 112.

If the native program 111 has not been started up yet, the Java program 112 starts the native program 111 (step S515). After that, the Java program 112 returns the process to step S506.

If the native program 111 has already been started up, the Java program 112 skips the process in step S515.

Instead, the Java program 112 may start the native program 111 without performing the determination in step S514 and cause the native program 111 to check redundant startup. In this method, if the native program 111 started up later detects redundant startup, the native program 111 started up later stops itself.

Note that it is also possible to prevent redundant startup, instead of determining it upon starting up the system. For example, when registering the native program 111 in the system startup unit 102, the framework 103 is prohibited from registering the Java program 112 as a program to be started up at the startup time of the system.

Any means for preventing redundant startup suffices. However, if the operation specifications require redundant startup of the native program 111, the redundant startup prevention processing is unnecessary.

An example of the Java program 112 and the native program 111 has been described above. However, the present invention is not limited to this.

Figure 7:
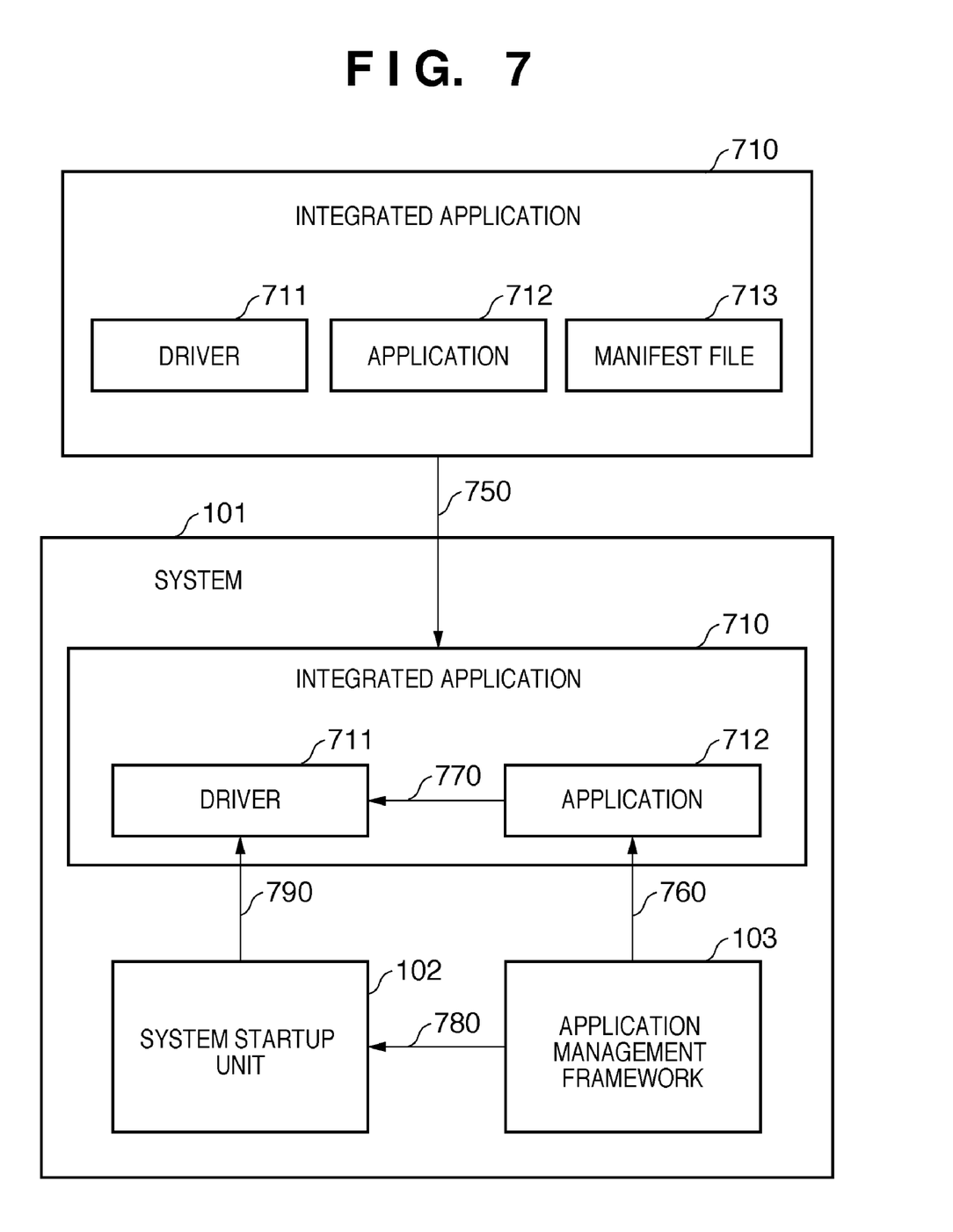
FIG. 7 is a block diagram showing another example of the functional arrangement of the information processing apparatus.

Another embodiment will be described with reference to FIG. 7. Referring to FIG. 7, an integrated application 710 includes a driver 711, an application 712, and a manifest file 713.

The driver 711 is typically a program for driving peripheral devices such as various kinds of I/Os. However, the present invention is not limited to this. The driver 711 has a function associated with that of the application 712 and is therefore packaged in the integrated application 710.

In this embodiment, the integrated application 710 is installed in a system 101, and the driver 711 and the application 712 are started up.

Figure 8:
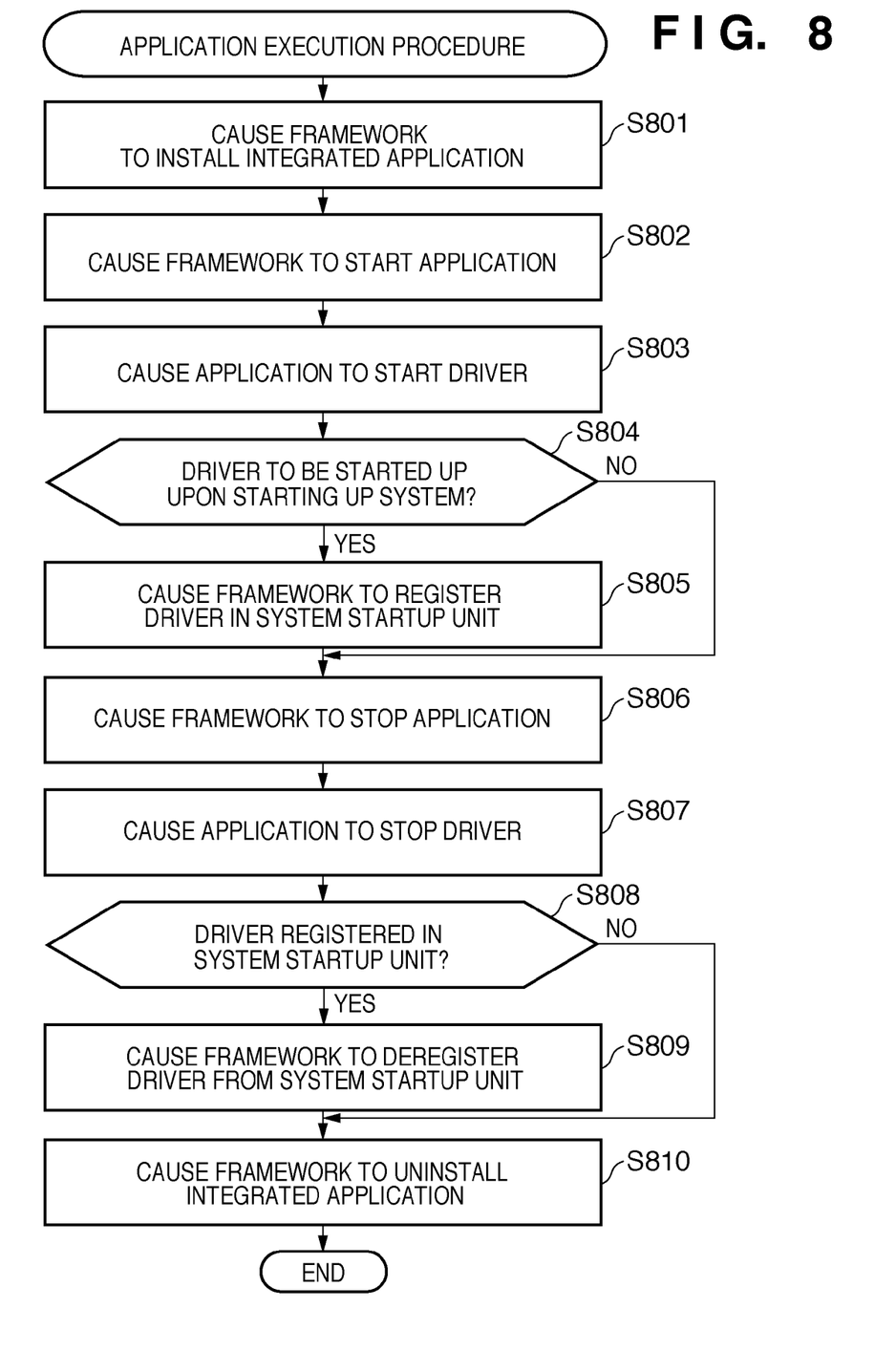
FIG. 8 is a flowchart illustrating an example of the execution procedure of an application.

The execution procedure of the application 712 will be described with reference to the flowchart in FIG. 8. First, to install the integrated application 710 in the system 101, the user performs a predetermined operation via an operation unit 206. Then, a framework 103 downloads the integrated application 710 from the outside of the system 101 to the inside of the system 101 (step S801), as indicated by 750 in FIG. 7. The downloaded integrated application 710 is stored in a predetermined place in an HD 209.

At the time of installation, the framework 103 stores information described in the manifest file 713 in a table (not shown) similar to the application management table 601. More specifically, an application ID, application path, driver presence/absence flag, driver path, driver name, and application start flag described in the manifest file are stored.

Next, to start the application 712, the user performs a predetermined operation via the operation unit 206. Then, the framework 103 starts the installed application 712 (step S802), as indicated by 760 in FIG. 7.

Upon being started, the application 712 starts or starts up the driver 711 (step S803), as indicated by 770 in FIG. 7.

The application 712 starts or starts up the driver 711 here. Instead, the application 712 may request a system startup unit 102 to start or start up the driver 711. Alternatively, the framework 103 may start or start up the driver 711 associated with the application 712. In the latter form, the driver 711 packaged in the integrated application 710 together with the application 712 is regarded as a driver associated with the application 712.

The driver 711 is started or started up in this way. At this point of time, the functions provided by the driver 711 and the application 712 are usable.

Next, the framework 103 determines whether to start up the driver 711 at the time of startup of the system 101 (step S804). Information representing whether to start up the driver is described in the manifest file 713.

Upon determining to start up the driver, the framework 103 registers the driver 711 in the system startup unit 102 (step S805), as indicated by 780 in FIG. 7. More specifically, the framework 103 invokes a system call of the OS to install the driver 711.

The driver 711 is registered in the system startup unit 102 here. In this embodiment, the driver 711 is started up. As a typical example, the driver 711 is registered in the operating system (OS). In the present invention, an OS of any type is usable.

If it is not determined to start up the driver, the framework 103 skips the process in step S805.

Next, to stop the application 712, the user performs a predetermined operation via the operation unit 206. Then, the framework 103 stops the application 712 (step S806).

When the application 712 is stopped, it stops the driver 711 (step S807).

The framework 103 then determines whether the driver 711 is registered in the system startup unit 102 (step S808). That is, the framework 103 determines whether the driver 711 has been registered in the system startup unit 102 in step S805.

Upon determining that the driver 711 is registered, the framework 103 deregisters the registered driver 711 from the system startup unit 102 (step S809). More specifically, the framework 103 invokes a system call of the OS to uninstall the driver 711.

Upon determining that the driver 711 is not registered, the framework 103 skips the process in step S809.

In this case, it is assumed that the user's stop operation is effective even in the next startup of the system 101, that is, startup is not performed at the next time of starting up the system 101. Without such specifications, steps S808 and S809 are unnecessary. If the specifications require deregistration only upon uninstallation, step S809 is executed after step S810 to be explained next.

Next, to uninstall the integrated application 710, the user performs a predetermined operation via the operation unit 206. Then, the framework 103 uninstalls the integrated application 710 (step S810). More specifically, the framework 103 uninstalls the integrated application 710 from the installed application storage area on the HD 209. At this time, information about the native application is deleted from the application management table 601 as well. Without the uninstallation operation, the process in step S810 is not performed. It does not mean that after stop of the application 712, the integrated application 710 should always be uninstalled.

In the above-described procedure, the framework 103 registers the driver 711 in the system startup unit 102 (step S805) after having started the application 712 (step S802).

However, another procedure may be adopted. For example, when the framework 103 has installed the integrated application 710 (step S801), the manifest file 713 becomes accessible. Hence, the driver 711 may be registered at this point of time.

Alternatively, the user may operate the operation unit 206 at another timing such as during the steady operation of the system 101 to make the framework 103 register the driver 711 in the system startup unit 102.

Figure 9A:
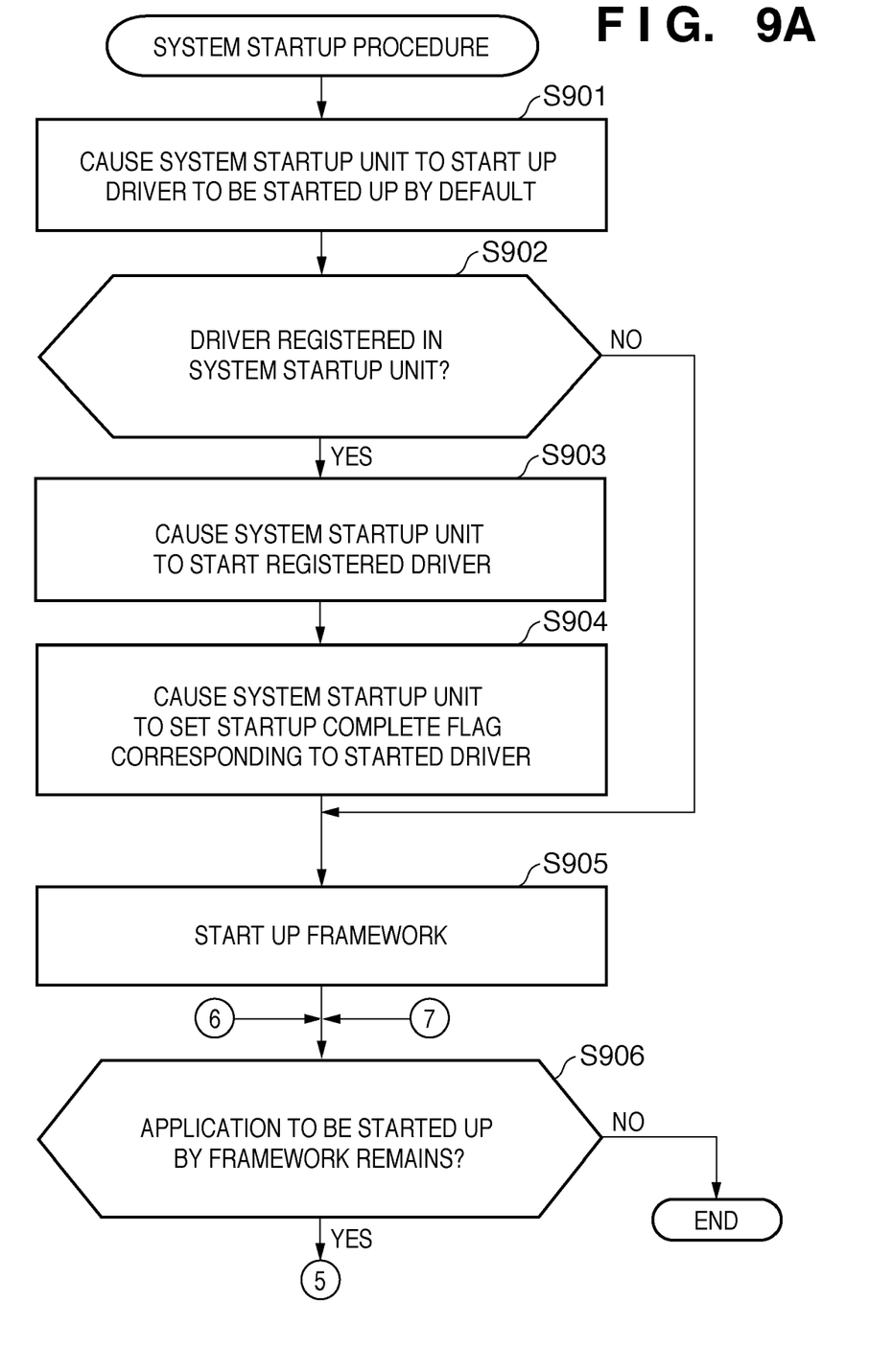
FIG. 9A is a flowchart illustrating another example of the procedure of starting up a system 101.
Figure 9B:
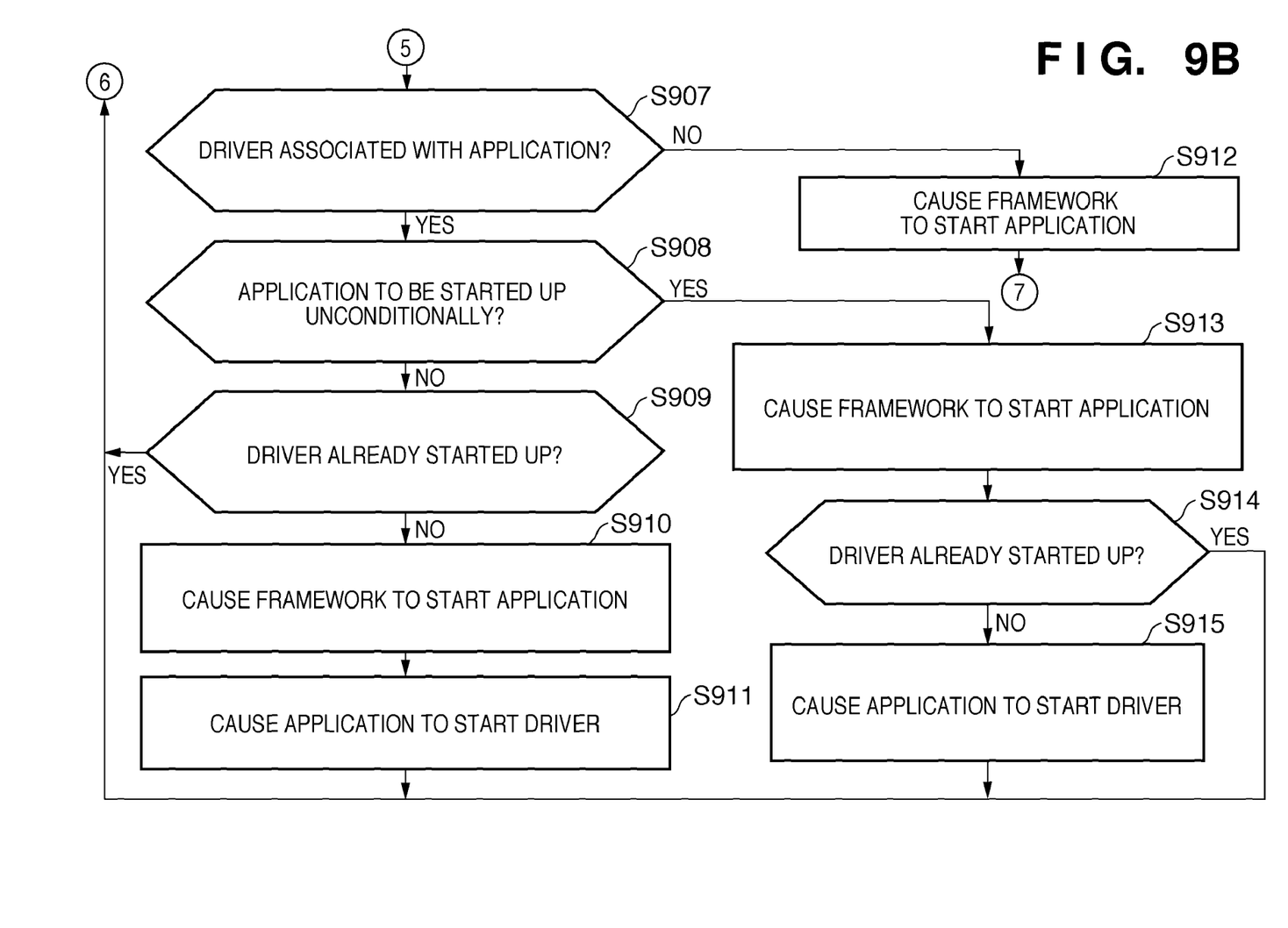
FIG. 9B is a flowchart illustrating another example of the procedure of starting up the system 101.

The startup procedure of the system 101 will be described next with reference to the flowcharts in FIGS. 9A and 9B.

First, the system startup unit 102 starts up drivers to be started up by default (step S901). These are programs built in the system 101 in advance, and installation by the user is unnecessary.

Next, the system startup unit 102 determines whether the driver 711 which should be started up upon starting up the system 101 is registered (step S902).

Upon determining that the driver 711 is registered, the system startup unit 102 starts or start up the registered driver 711 (step S903), as indicated by 790 in FIG. 7. The startup method is the same as that of a normal driver.

The system startup unit 102 sets the startup complete flag corresponding to the started or started up driver 711 (step S904). More specifically, the driver startup complete flag is set in the table (not shown) similar to the application management table 601, which corresponds to the driver 711. As another method, if the framework 103 is managing the table, the system startup unit 102 may request the framework 103 to set the flag.

In the procedure of steps S902 to S904, a plurality of registered drivers 711 can be started, and flags for them can be set. A description of a loop will be omitted.

Upon determining in step S902 that the driver 711 is not registered, the system startup unit 102 advances the process to step S905.

When startup of the drivers 711 is complete, the system 101 starts up the framework 103 (step S905).

The framework 103 then determines whether the application 712 to be started up remains (step S906).

If YES in step S906, the framework 103 determines whether there exists the driver 711 associated with the application 712 (step S907). More specifically, the determination is done by confirming the driver presence/absence flag corresponding to the application 712.

If the driver 711 is not present, the framework 103 simply starts the application 712 (step S912). After that, the framework 103 returns to step S906.

If the driver 711 is present, the framework 103 confirms an application start flag corresponding to the application 712 and determines whether to unconditionally start the application 712 (step S908). If the application start flag is set to "start", it is interpreted as the application 712 should be started unconditionally.

Upon determining not to unconditionally start, the framework 103 confirms the driver startup complete flag corresponding to the application 712, and determines whether the driver 711 has already been started up (step S909).

If the driver has already been started up, the framework 103 returns to step S906.

If the driver has not been started up yet, the framework 103 starts up the application 712 (step S910).

The application 712 then starts or starts up the driver 711 (step S911). After that, the application 712 returns the process to step S906.

When the framework 103 has finished starting up all the applications 712 to be started up, step S906 ends with NO, and the processing ends.

In step S908, it is determined whether to unconditionally start. "Unconditionally" means that "even when the system startup unit 102 has already started up the driver 711". A sequence in this case will be explained below.

Upon determining in step S908 to unconditionally start, the framework 103 starts up the application 712 (step S913).

Next, the application 712 determines whether the driver 711 has already been started up (step S914). The determination may be done based on the driver startup complete flag. Alternatively, the determination may be done using a predetermined interface between the driver 711 and the application 712.

If the driver 711 has not been started up yet, the application 712 starts or starts up the driver 711 (step S915). After that, the process returns to step S906.

If the driver 711 has already been started up, the application 712 skips the process in step S915.

Instead, the application 712 may start or start up the driver 711 without performing the determination in step S914 and cause the driver 711 to check redundant startup. In this case, if the driver 711 started up later detects redundant startup, the driver 711 started up later stops itself.

Note that it is also possible to prevent redundant startup, instead of determining it upon starting up the system. For example, when registering the driver 711 in the system startup unit 102, the framework 103 is prohibited from registering the application 712 as a program to be started up at the startup time of the system.

Any means for preventing redundant startup suffices. However, if the operation specifications require redundant startup of the driver 711, the redundant startup prevention procedure is unnecessary.

An embodiment of use of the driver 711 and the application 712 has been described above. However, the present invention is not limited to this. The present invention is also applicable to a service (called a daemon for some OSes) that is a program to be started up upon starting up the system. The present invention can also be applied between two services having a dependence relationship. The present invention is independent of the OS.

The object of the present invention is also achieved by the following method. A storage medium (or recording medium) which records software program codes to implement the functions of the above-described embodiments is supplied to a system or apparatus. The central processing unit (CPU or MPU) of the system or apparatus reads out and executes the program codes stored in the storage medium. In this case, the program codes read out from the storage medium themselves implement the functions of the above-described embodiments. The storage medium that records the program codes constitutes the present invention.

When the central processing unit of the system or apparatus executes the readout program codes, the operating system (OS) running on the system or apparatus partially or wholly executes actual processing based on the instructions of the program codes. The present invention also incorporates a case in which the functions of the above-described embodiments are implemented by the processing.

Assume that the program codes read out from the storage medium are written in the memory of a function expansion card inserted to the system or apparatus or a function expansion unit connected to the system or apparatus. After that, the CPU of the function expansion card or function expansion unit partially or wholly executes actual processing based on the instructions of the program codes. The present invention also incorporates a case in which the functions of the above-described embodiments are implemented by the processing.

When the present invention is applied to the storage medium, the storage medium stores program codes corresponding to the above-described flowcharts.

According to the above-described embodiments, it is possible to systematically manage startup of programs of different types and enable quick startup of a program which should be started up at an early stage upon starting up the system. According to the above-described embodiments, redundant startup can be prevented. According to the above-described embodiments, a program can be excluded from the early startup targets at the time of system startup. This enables program management with the same operability as before. That is, seamless program control management independent of program types is possible.

The present invention is not limited to the above-described embodiment and various changes and modifications can be made within the spirit and scope of the present invention. Therefore, to apprise the public of the scope of the present invention, the following claims are made.

This application claims the benefit of Japanese Patent Application No. 2007-152062, filed Jun. 7, 2007, which is hereby incorporated by reference herein in its entirety.

The invention claimed is:

1. A program startup apparatus comprising:
a first startup unit that starts up a first program; and
a second startup unit that starts up a second program,
wherein the first program starts up the second program,
wherein the second startup unit notifies the first startup unit that the second program has been started up,
wherein the apparatus further comprises a setting unit that sets the second startup unit that starts up the second program so as to start up the second program before the first program, and
wherein at least one of the above units is included in a computer.

2. The program startup apparatus according to claim 1, wherein the first startup unit is a program in itself, and the second startup unit starts up the first startup unit.

3. The program startup apparatus according to claim 2, wherein the second program, the first startup unit, and the first program are started up so as to start up the second program before the first program.

4. The program startup apparatus according to claim 1, further comprising a prevention unit that prevents the second startup unit and the first program from redundantly starting up the second program.

5. The program startup apparatus according to claim 4, wherein the prevention unit stops, out of two second programs redundantly started up by the second startup unit and the first program, a second program started up later.

6. The program startup apparatus according to claim 4, wherein the prevention unit further comprises a setting unit that sets the first startup unit not to start up the first program when the second startup unit is set to start up the second program.

7. The program startup apparatus according to claim 1, wherein the first startup unit comprises an installation unit that installs an application including the first program and the second program, and the first startup unit is a framework which manages the installed application.

8. The program startup apparatus according to claim 1, wherein the first program is a Java program, and the second program is a native program including a native code.

9. A program startup apparatus comprising:
a first startup unit that starts up a first program; and
a second startup unit that starts up a second program,
wherein the first program starts up the second pro gram,
wherein the first startup unit sets the second startup unit not to start up the second program when the first program has stopped the second program,
wherein the apparatus further comprises a setting unit that sets the second startup unit that starts up the second program so as to start up the second program before the first program, and
wherein at least one of the above units is included in a computer.

10. A program startup method including a first startup unit that starts up a first program, and a second startup unit that starts up a second program, comprising:
causing the first program to start up the second program, and
starting up the second program so as to start up the second program before the first program,
wherein the second startup unit notifies the first startup unit that the second program has been started up.

11. The program startup method according to claim 10, wherein the first startup unit is a program in itself, and the second startup unit starts up the first startup unit.

12. The program startup method according to claim 11, wherein the second program, the first startup unit, and the first program are started up so as to start up the second program before the first program.

13. The program startup method according to claim 10, wherein the second startup unit and the first program are prevented from redundantly starting up the second program.

14. The program startup method according to claim 13, wherein out of two second programs redundantly started up by the second startup unit and the first program, a second program started up later is stopped.

15. The program startup method according to claim 13, wherein the first startup unit is set not to start up the first program when the second startup unit is set to start up the second program.

16. The program startup method according to claim 10, wherein the first startup unit installs an application including the first program and the second program, and the first startup unit is a framework which manages the installed application.

17. The program startup method according to claim 10, wherein the first program is a Java program, and the second program is a native program including a native code.

18. A program startup method including a first startup unit that starts up a first program, and a second startup unit that starts up a second program, comprising:
causing the first program to start up the second program, and
starting up the second program so as to start up the second program before the first program,
wherein the first startup unit sets the second startup unit not to start up the second program when the first program has stopped the second program.

* * * * *